United States Patent Office 2,883,383
Patented Apr. 21, 1959

2,883,383

RESCINNAMINE PHOSPHATES

Emil Schlittler, Madison, N.J., assignor to Ciba Pharmaceutical Products, Inc., Summit, N.J., a corporation of New Jersey No Drawing. Application December 1, 1955
Serial No. 550,488

2 Claims. (Cl. 260—286)

This invention relates to a new salt of the alkaloid rescinnamine with the specific tribasic inorganic acid, namely phosphoric acid.

Rescinnamine, the 3,4,5-trimethoxy cinnamic acid ester of methyl reserpate is disclosed in copending application Serial No. 411,541, filed February 19, 1954, of Paul R. Ulshafer. It is a valuable therapeutically active compound distinguished by its sedative and hypotensive activity on account of which it can be used as a medicament for the treatment of hypertension, states of tension and anxiety, as well as mental disorders. For parenteral use an aqueous solution of rescinnamine would be most desirable. However, rescinnamine is insoluble in water.

In order to overcome this difficulty I have prepared various common salts of rescinnamine with acids such as hydrochloric and sulfuric acid. Such salts, however, do not possess the necessary degree of water solubility to be used as parenterally applicable forms of rescinnamine.

I have now found that the salt of rescinnamine with phosphoric acid is non-toxic and surprisingly very water-soluble and, therefore, excellently suited for making aqueous solutions exhibiting the effects of the water-insoluble rescinnamine.

The new compound rescinnamine phosphate accordingly is useful as a medicament possessing substantially the activity of rescinnamine and is especially useful for preparing injectable aqueous solutions. Such solutions may contain from about 0.1 mg. to about 250 mg., preferably from about 0.2 mg. to about 50 mg. rescinnamine phosphate per dosage unit. The amount used in actual treatment is largely dependent on the condition of the individual patient and the desires of the physician.

Rescinnamine phosphate is prepared conveniently by dissolving rescinnamine in methanolic phosphoric acid and precipitating the salt with ether. The following example illustrates the invention, the temperatures being given in degrees centigrade.

Example 10 g. rescinnamine are dissolved in a solution of 2.01 g. 85 percent phosphoric acid (Oldbury Chemical Co. pharmaceutical grade) in 30 ml. methanol and the solution filtered to remove a trace of insoluble material. To the filtrate is added with stirring 300 ml. of ether. After stirring for a few minutes longer, the resulting white solid has acquired a very faint yellowish tint. The precipitate is collected on a Büchner funnel, washed on the funnel with 2×200 ml. portions of ether and then sucked under a rubber dam. The cake is then washed with 2×50 ml. portions of 80:20 (v./v.) ether-methanol to remove any residual phosphoric acid and then with several additional portions of ether.

The resulting rescinnamine phosphate is then dried for two days at about 20 mm. (Hg) pressure over calcium chloride and phosphorus pentoxide at room temperature. Drying is continued for 18 hours more at about 1 mm. (Hg) pressure over phosphorus pentoxide at room temperature. A yield of 10.6 g. rescinnamine phosphate containing about 2 moles of water is obtained having a faint yellowish tint; it sinters at 181°, M.P. 183–188°. By more vigorous drying rescinnamine phosphate can be obtained in substantially water-free form.

Rescinnamine phosphate can be made up into an injectable solution as follows: 100 mg. rescinnamine phosphate is dissolved in 10 ml. of water. After filtration through a porcelain microbiological filter, the thus obtained sterile solution can be used for injection. The solution may, if desired, be lyophilized in ampoules.

What is claimed is:
1. Rescinnamine phosphate.
2. Rescinnamine phosphate dihydrate.

References Cited in the file of this patent
FOREIGN PATENTS 521,626    Belgium _____ Jan. 23, 1954

OTHER REFERENCES

Haack et al., Die Naturwissenschaften, vol. 41, pp. 214–215 (1954).